US008363605B2

(12) United States Patent
Montojo et al.

(10) Patent No.: US 8,363,605 B2
(45) Date of Patent: Jan. 29, 2013

(54) METHOD AND APPARATUS FOR MONITORING GRANT CHANNELS IN WIRELESS COMMUNICATION

(75) Inventors: Juan Montojo, San Diego, CA (US); Stein Arne Lundby, Solana Beach, CA (US); Etienne F. Chaponniere, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1086 days.

(21) Appl. No.: 11/842,878

(22) Filed: Aug. 21, 2007

(65) Prior Publication Data

US 2008/0049669 A1 Feb. 28, 2008

Related U.S. Application Data

(60) Provisional application No. 60/839,514, filed on Aug. 22, 2006, provisional application No. 60/849,198, filed on Oct. 3, 2006.

(51) Int. Cl.
*H04W 4/00* (2009.01)

(52) U.S. Cl. ............... 370/329; 370/345; 455/456.1

(58) Field of Classification Search .......... 370/329, 370/336, 325; 455/456.1, 454.2, 67.11
See application file for complete search history.

(56) References Cited

U.S. PATENT DOCUMENTS

| 7,149,203 B2 | 12/2006 | Hsu et al. | |
| 2005/0193310 A1* | 9/2005 | Obuchi et al. | 714/752 |
| 2005/0243768 A1* | 11/2005 | Terry et al. | 370/329 |
| 2006/0052111 A1* | 3/2006 | Gaal et al. | 455/452.1 |
| 2006/0056355 A1* | 3/2006 | Love et al. | 370/332 |
| 2006/0072503 A1* | 4/2006 | Kim et al. | 370/329 |
| 2006/0268884 A1* | 11/2006 | Terry et al. | 370/394 |
| 2007/0042785 A1* | 2/2007 | Nakamata | 455/450 |
| 2007/0054652 A1* | 3/2007 | Pan et al. | 455/403 |
| 2007/0124774 A1* | 5/2007 | Roberts et al. | 725/62 |

FOREIGN PATENT DOCUMENTS

| JP | 2007501573 | 1/2007 |
| RU | 2262196 | 2/2005 |
| WO | 2005018270 | 2/2005 |
| WO | WO2005034534 A2 | 4/2005 |
| WO | 1557968 | 7/2005 |
| WO | WO2005071874 A1 | 8/2005 |
| WO | WO2005104402 | 11/2005 |

OTHER PUBLICATIONS

3GPP TR 25.903 V7.0, "Continuous Connectivity for Packet Data Users", p.p. covers and 132, Mar. 2007.*
QUALCOMM Europe: "Monitoring of HSUPA Grant Channels" 3GPP TSG-RAN WG1 Meeting #46, No. R1-062152, Aug. 28, 2006-Sep. 1, 2006 pp. 1-3, XP002466501—Tallinn, Estonia.

(Continued)

*Primary Examiner* — Jung Park
(74) *Attorney, Agent, or Firm* — Charles Chesney

(57) ABSTRACT

Techniques for monitoring grant channels in a wireless communication network are described. In one design, a user equipment (UE) determines whether a monitoring condition is satisfied, monitors at least one grant channel for grants of radio resources if the monitoring condition is satisfied, and stops monitoring the at least one grant channel if the monitoring condition is not satisfied. The UE may determine that the monitoring condition is satisfied after sending scheduling information indicating that there is data to send, if there is an outstanding grant of radio resources, if a grant of radio resources is expected, if there is at least one scheduled flow and a data buffer for the scheduled flow(s) is not empty, if there is an outstanding grant of radio resources and data transmission has been sent using this grant of radio resources, if there is at least one other control channel to monitor, etc.

37 Claims, 6 Drawing Sheets

OTHER PUBLICATIONS

QUALCOMM Europe: "Monitoring of HSUPA Grant Channels" 3GPP TSG-RAN WG1 Meeting #54, No. R1-062393, Aug. 28, 2006-Sep. 1, 2006 pp. 1-3, XP002466502—Tallinn, Estonia.

3rd Generation Partnership Project; Technical Specification Group Radio Access Network; Physical Channels and Mapping of Transport Channels onto Physical Channels, 3GPP TS 25.211. V7.0.0, Mar. 2006, pp. 1-50.

3rd Generation Partnership Project; Technical Specification Group Radio Access Network, Radio Interface Protocol Architecture, 3GPP TS 25.301 V7.0.0, Mar. 2006, pp. 1-48.

3rd Generation Partnership Project; Technical Specification Group Radio Access Network; "Medium Access Control (MAC) protocol specification," 3GPP TS 25.321, V7.1.0, Jun. 2006. pp. 1-92.

3rd Generation Partnership Project; Technical Specification Group Radio Access Network; "Continuous Connectivity for Packet Data Users," 3GPP TS 25.903, V7.0.0, Mar. 2007, pp. 1-138.

3rd Generation Partnership Project; Technical Specification Group Radio Access Network; "Physical Layer Procedures FDD," 3GPP TS 25.214, V7.4.0, Mar. 2007, pp. 1-76.

International Search Report—PCT/US07/076586—International Search Authority—European Patent Office—Feb. 15, 2008.

Written Opinion—PCT/US07/076586—International Search Authority—European Patent Office, Munich—Feb. 15, 2008.

International Search Report, PCT/US07/076586, International Search Authority, European Patent Office, Feb. 15, 2008.

Written Opinion, PCT/US07/076586, International Search Authority, European Patent Office. Feb. 15, 2008.

QUALCOMM Europe. "Monitoring of HSUPA Grant Channels," 3GPP TSG-RAN WG1 Meeting #46, No. R1-062152. Aug. 28, 2006-Sep. 1, 2006, pp. 1-3, Tallin, Estonia, XP002466501.

QUALCOMM Europe. "monitoring of HSUPA Grant Channels," 3GPP TSG-RAN WG2 Meeting #54, No. R1-062393, Aug. 28, 2006-Sep. 1, 2006, pp. 1-3, Tallin, Estonia, XP002466502.

Ericsson, "A way forward to specify the requirements for active set size", 3GPP TSG-RAN Group Meeting #28, RP-050348, Jun. 1-3, 2005.

Taiwan Search Report—TW096131110—TIPO—Jun. 3, 2011.

* cited by examiner

METHOD AND APPARATUS FOR MONITORING GRANT CHANNELS IN WIRELESS COMMUNICATION

CLAIM OF PRIORITY UNDER 35 U.S.C. §119

The present Application for Patent claims priority to Provisional Application Ser. No. 60/839,514, entitled "MONITORING OF GRANT CHANNELS FOR WIRELESS COMMUNICATION," filed Aug. 22, 2006, and Ser. No. 60/849,198, entitled "METHOD AND APPARATUS FOR CHANNEL MONITORING IN WIRELESS COMMUNICATIONS," filed Oct. 3, 2006, both assigned to the assignee hereof, and expressly incorporated herein by reference.

BACKGROUND

I. Field

The present disclosure relates generally to communication, and more specifically to techniques for channel monitoring in a wireless communication network.

II. Background

Wireless communication networks are widely deployed to provide various communication services such as voice, video, packet data, messaging, broadcast, etc. These networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless network may utilize a resource assignment scheme in which a user equipment (UE) may request for resources when there is data to send and may receive grants of resources via a control channel. The UE may be expected to monitor the control channel at all times in order to not miss any grant of resources sent to the UE. This continuous monitoring of the control channel may consume battery power and shorten standby time and talk time, all of which are undesirable.

SUMMARY

Techniques for efficiently monitoring grant channels in a wireless communication network are described herein. The grant channels may comprise an E-DCH Absolute Grant Channel (E-AGCH) and an E-DCH Relative Grant Channel (E-RGCH) used for High-Speed Uplink Packet Access (HSUPA) in Universal Mobile Telecommunication System (UMTS) or some other grant channels in other wireless networks.

In one design, a UE may determine whether a monitoring condition is satisfied. The UE may monitor at least one grant channel for grants of radio resources if the monitoring condition is satisfied. The UE may stop monitoring the at least one grant channel if the monitoring condition is not satisfied. The UE may determine that the monitoring condition is satisfied and may monitor the at least one grant channel (i) after sending scheduling information indicating that there is data to send on the uplink, (ii) if there is an outstanding grant of radio resources for the uplink, (iii) if a grant of radio resources is expected, (iv) if there is at least one scheduled flow and a data buffer for the scheduled flow(s) is not empty, (v) if there is an outstanding grant of radio resources and data transmission has been sent using this grant of radio resources, (vi) if there is at least one other control channel to monitor, and/or (vii) based on other criteria.

In another design, when discontinuous reception (DRX) is enabled, the UE may perform downlink reception of an E-AGCH and an E-RGCH if at least one MAC-d flow is configured with a scheduled transmission and a data buffer is not empty. The UE may also perform downlink reception of the E-AGCH and E-RGCH (i) if there is an outstanding grant of radio resources and data transmission has been sent using the outstanding grant of radio resources, (ii) when there is at least one other control channel to monitor, and/or (iii) based on other criteria.

Various aspects and features of the disclosure are described in further detail below.

DETAILED DESCRIPTION

The channel monitoring techniques described herein may be used for various wireless communication networks such as CDMA, TDMA, FDMA, OFDMA and SC-FDMA networks. The terms "network" and "system" are often used interchangeably. A CDMA network may implement a radio technology such as Universal Terrestrial Radio Access (UTRA), cdma2000, etc. UTRA includes Wideband-CDMA (W-CDMA), Low Chip Rate (LCR), etc. cdma2000 covers IS-2000, IS-95, and IS-856 standards. A TDMA network may implement a radio technology such as Global System for Mobile Communications (GSM), etc. An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. These various radio technologies and standards are known in the art. UTRA, E-UTRA, and GSM are described in documents from an organization named "3rd Generation Partnership Project" (3GPP). cdma2000 is described in documents from an organization named "3rd Generation Partnership Project 2" (3GPP2). 3GPP and 3GPP2 documents are publicly available. For clarity, certain aspects of the techniques are described below for a UMTS network that utilizes W-CDMA, and 3GPP terminology is used in much of the description below.

Figure 1:
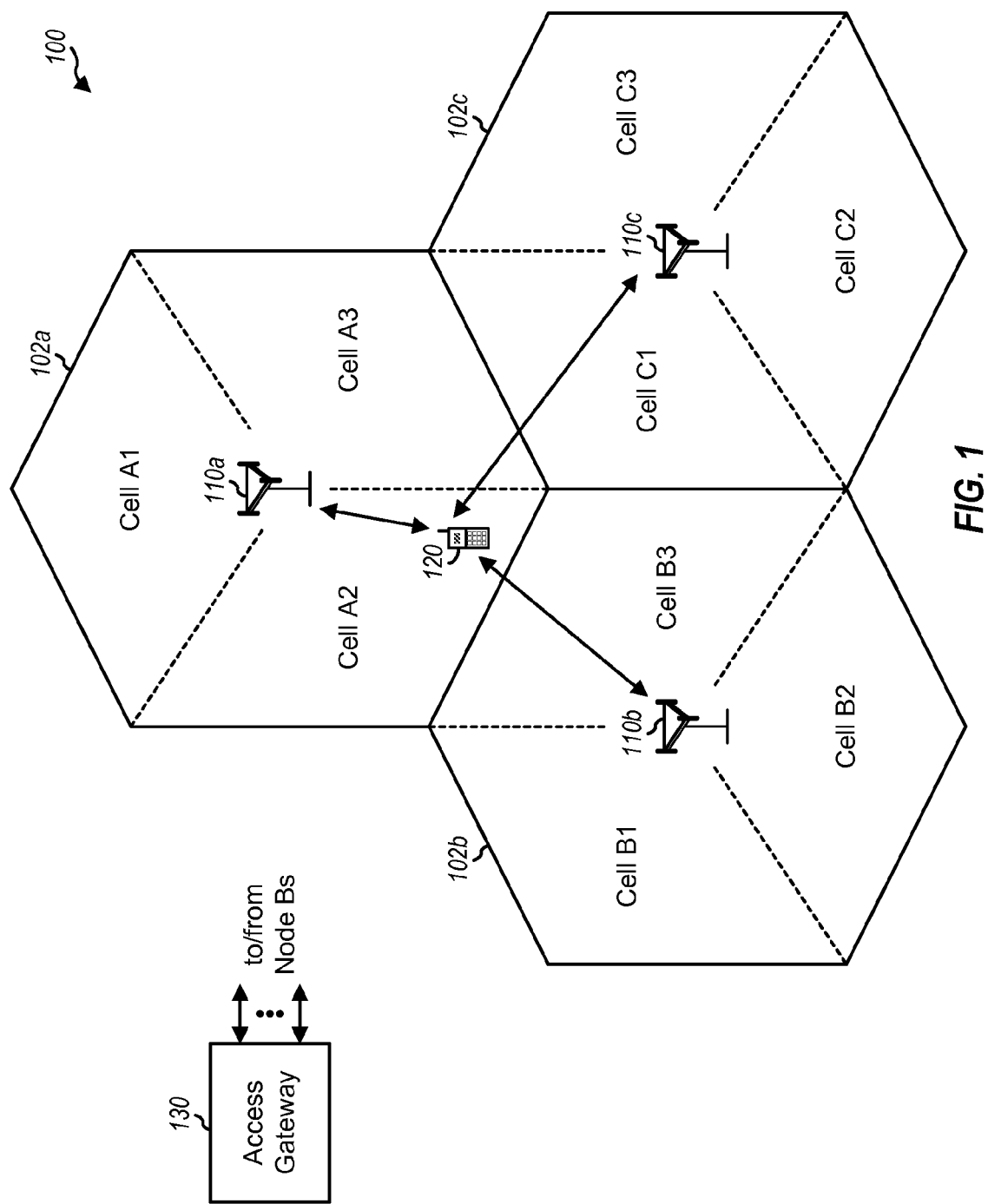
FIG. 1 shows a wireless communication network.

FIG. 1 shows a wireless communication network 100, which may be a UMTS network. Wireless network 100 may also be referred to as a Universal Terrestrial Radio Access Network (UTRAN) in 3GPP. Wireless network 100 may include any number of Node Bs that support communication for any number of UEs. For simplicity, only three Node Bs 110a, 110b and 110c and one UE 120 are shown in FIG. 1.

A Node B is generally a fixed station that communicates with the UEs and may also be referred to as an evolved Node B (eNode B), a base station, an access point, etc. Each Node B provides communication coverage for a particular geographic area and supports communication for the UEs located within the coverage area. The coverage area of a Node B may be partitioned into multiple (e.g., three) smaller areas, and each smaller area may be served by a respective Node B subsystem. The term "cell" can refer to the smallest coverage area of a Node B and/or the subsystem serving this coverage area, depending on the context in which the term is used. In the example shown in FIG. 1, Node B 110a serves cells A1, A2 and A3, Node B 110b serves cells B1, B2 and B3, and Node B 110c serves cells C1, C2 and C3. The Node Bs may be operated synchronously or asynchronously. For a synchronous network, the timing of the Node Bs may be aligned to a reference time, e.g., GPS time. For an asynchronous network, but the timing of the cells of each Node B may be aligned, but the timing of different Node Bs may not be aligned.

In general, any number of UEs may be dispersed throughout the wireless network, and each UE may be stationary or mobile. UE 120 may also be referred to as a mobile station, a terminal, an access terminal, a subscriber unit, a station, etc. UE 120 may be a cellular phone, a personal digital assistant (PDA), a wireless device, a handheld device, a wireless modem, a modem card, a laptop computer, etc. UE 110 may communicate with zero or more Node Bs on the downlink and uplink at any given moment. The downlink (or forward link) refers to the communication link from the Node Bs to the UE, and the uplink (or reverse link) refers to the communication link from the UE to the Node Bs.

Wireless network 100 may include other network entities such as those described by 3GPP. An access gateway 130 may couple to the Node Bs and provide coordination and control for these Node Bs. Access gateway 130 may also support communication services for the UEs, e.g., packet data, Voice-over-IP (VoIP), video, messaging, and/or other services. Access gateway 130 may be a single network entity or a collection of network entities. For example, access gateway 130 may comprise one or more Radio Network Controllers (RNCs), Serving GPRS Support Nodes (SGSNs), and Gateway GPRS Support Nodes (GGSNs), which are known in the art. Access gateway 130 may couple to a core network that may include network entities supporting various functions such as packet routing, user registration, mobility management, etc.

3GPP Release 5 and later supports High-Speed Downlink Packet Access (HSDPA). 3GPP Release 6 and later supports High-Speed Uplink Packet Access (HSUPA). HSDPA and HSUPA are sets of channels and procedures that enable high-speed packet data transmission on the downlink and uplink, respectively.

Figure 2:
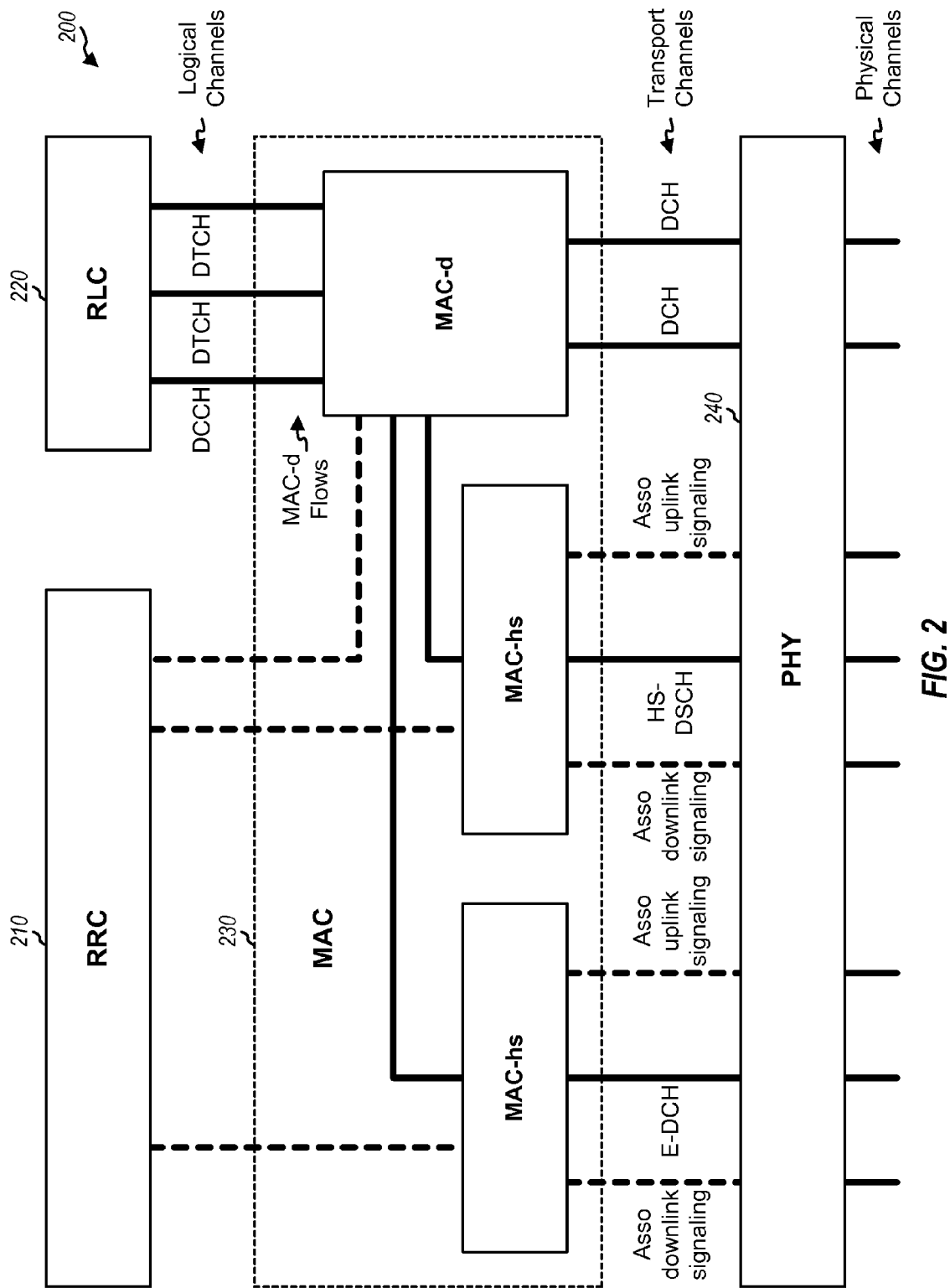
FIG. 2 shows a layer structure for data and signaling transmission.

FIG. 2 shows a layer structure 200 for 3GPP Release 6. Layer structure 200 includes a Radio Resource Control (RRC) layer 210, a Radio Link Control (RLC) layer 220, a Medium Access Control (MAC) layer 230, and a physical (PHY) layer 240. The RRC layer performs various functions for establishment, maintenance and termination of calls. The RLC layer provides various services to upper layers such as transparent data transfer, unacknowledged data transfer, acknowledged data transfer, maintenance of quality of service (QoS) as defined by upper layers, and notification of unrecoverable errors. The RLC layer processes and provides data in logical channels, e.g., a Dedicated Traffic Channel (DTCH) and a Dedicated Control Channel (DCCH) for transfer of traffic data and signaling between UE 120 and the network.

The MAC layer provides various services to upper layers such as data transfer, reallocation of radio resources and MAC parameters, and reporting of measurements. The MAC layer includes various entities such as MAC-d, MAC-hs, and MAC-es. Other MAC entities are present in 3GPP Release 6 but are not shown in FIG. 2 for simplicity. MAC-d entity provides functionality such as transport channel type switching, multiplexing of logical channels to transport channels (C/T MUX), ciphering, deciphering, and uplink transport format combination (TFC) selection. MAC-hs supports HSDPA and performs functions such as transmission and retransmission (HARQ), reordering, and disassembly. MAC-es supports HSUPA and performs functions such as HARQ, multiplexing, and evolved TFC (E-TFC) selection. The MAC layer processes and provides data in transport channels, e.g., a Dedicated Channel (DCH), an Enhanced Dedicated Channel (E-DCH), and a High Speed Downlink Shared Channel (HS-DSCH).

The physical layer provides mechanism for transferring data for the MAC layer and signaling for higher layers. The various layers in FIG. 2 are described in detail in 3GPP TS 25.301, entitled "Radio Interface Protocol Architecture," June 2007, and in 3GPP TS 25.321, entitled "Medium Access Control (MAC) protocol specification," June 2007, which are publicly available.

As shown in FIG. 2, data for UE 120 may be processed as one or more logical channels at the RLC layer. The logical channels may be mapped to MAC-d flows at the MAC layer. The MAC-d flows may also be referred to as QoS flows and may be multiplexed onto one or more transport channels. The transport channels may carry data for one or more services, e.g., voice, video, packet data, etc. The transport channels are mapped to physical channels at the physical layer. The physical channels are channelized with different channelization codes and are orthogonal to one another in code domain.

Table 1 lists some physical channels in 3GPP Release 6, including physical channels for HSDPA and HSUPA.

TABLE 1

|  | Channel | Channel Name | Description |
|---|---|---|---|
|  | P-CCPCH | Primary Common Control Physical Channel | Carry pilot and system frame number (SFN). |
|  | Uplink DPCCH | Dedicated Physical Control Channel | Carry pilot and control information on uplink. |
|  | Uplink DPDCH | Dedicated Physical Data Channel | Carry data from a UE. |
| HSDPA | HS-SCCH (Downlink) | Shared Control Channel for HS-DSCH | Carry format information for packets sent on the HS-PDSCH. |
|  | HS-PDSCH (Downlink) | High Speed Physical Downlink Shared Channel | Carry packets sent on the downlink for different UEs. |
|  | HS-DPCCH (Uplink) | Dedicated Physical Control Channel for HS-DSCH | Carry ACK/NAK for packets received on the HS-PDSCH and channel quality indicator (CQI). |

TABLE 1-continued

| Channel | | Channel Name | Description |
|---|---|---|---|
| HSUPA | E-DPCCH (Uplink) | E-DCH Dedicated Physical Control Channel | Carry signaling for the E-DPDCH. |
| | E-DPDCH (Uplink) | E-DCH Dedicated Physical Data Channel | Carry packets sent on the uplink by a UE. |
| | E-HICH (Downlink) | E-DCH Hybrid ARQ Indicator Channel | Carry ACK/NAK for packets sent on the E-DPDCH. |
| | E-AGCH (Downlink) | E-DCH Absolute Grant Channel | Carry absolute grants of resources for the E-DPDCH. |
| | E-RGCH (Downlink) | E-DCH Relative Grant Channel | Carry relative grants of resources for the E-DPDCH. |

For HSUPA, the E-DPDCH is a physical channel used to carry the E-DCH transport channel. There may be zero, one, or several E-DPDCHs on a link between a UE and a cell. The E-DPCCH is a physical channel used to send control information associated with the E-DCH. There is at most one E-DPCCH on a link. The E-DPCCH and E-DPDCH are control and data channels, respectively, for high rate data in HSUPA. The E-HICH is a fixed rate dedicated downlink physical channel carrying acknowledgements (ACKs) and negative acknowledgements (NAKs) for packets sent on the E-DPDCH.

The E-AGCH and E-RGCH are grant channels used for resource control in HSUPA and are also referred to as E-DCH control channels. The E-AGCH is a fixed rate downlink physical channel carrying absolute grants for the E-DPDCH. For HSUPA, the E-DPDCH is configured ahead of time, and an absolute grant indicates an amount of transmit power that a UE may use for the E-DPDCH. A grant is valid for an indefinite period of time until it is modified or revoked. The E-RGCH is a fixed rate downlink physical channel carrying relative grants for the E-DPDCH. A relative grant indicates a change from the current grant, e.g., an increase or decrease of the current grant by some amount. In general, a grant channel is a channel used to convey grants of radio resources for a link. The radio resources may be quantified by time, frequency, code, transmit power, etc., or any combination thereof. A grant of radio resources for a UE may also be referred to as a scheduling grant or a resource grant. A grant may be zero or non-zero.

For HSUPA, a UE may have a serving E-DCH radio link set, which may be referred to as a serving RLS. The serving RLS may contain a serving cell for the UE for HSUPA and possibly additional cells from which the UE can receive and combine relative grants. The cell(s) in the serving RLS are from a single Node B. For example, in FIG. 1, the serving RLS for the UE may include serving cell A2 and additional cell A3. Cells not in the serving RLS may include cells B3, C1, etc.

A UE may receive absolute grants from the serving cell via the E-AGCH. The UE may receive relative grants to increase, maintain or decrease the current grant from the cells in the serving RLS via the E-RGCH. The UE may receive relative grants to maintain or decrease the current grant from cells not in the serving RLS via the E-RGCH. The relative grants and the E-RGCH from the cells in the serving RLS may be referred to as serving relative grants and serving E-RGCH, respectively. The relative grants and the E-RGCH from cells not in the serving RLS may be referred to as non-serving relative grants and non-serving E-RGCH, respectively. The cells in the serving RLS send the same serving relative grants, and the UE may soft-combine these relative grants. The cells not in the serving RLS may send non-serving relative grants for uplink interference control to avoid overload situations for these cells. The non-serving relative grants may be different from the serving relative grants.

Figure 3:
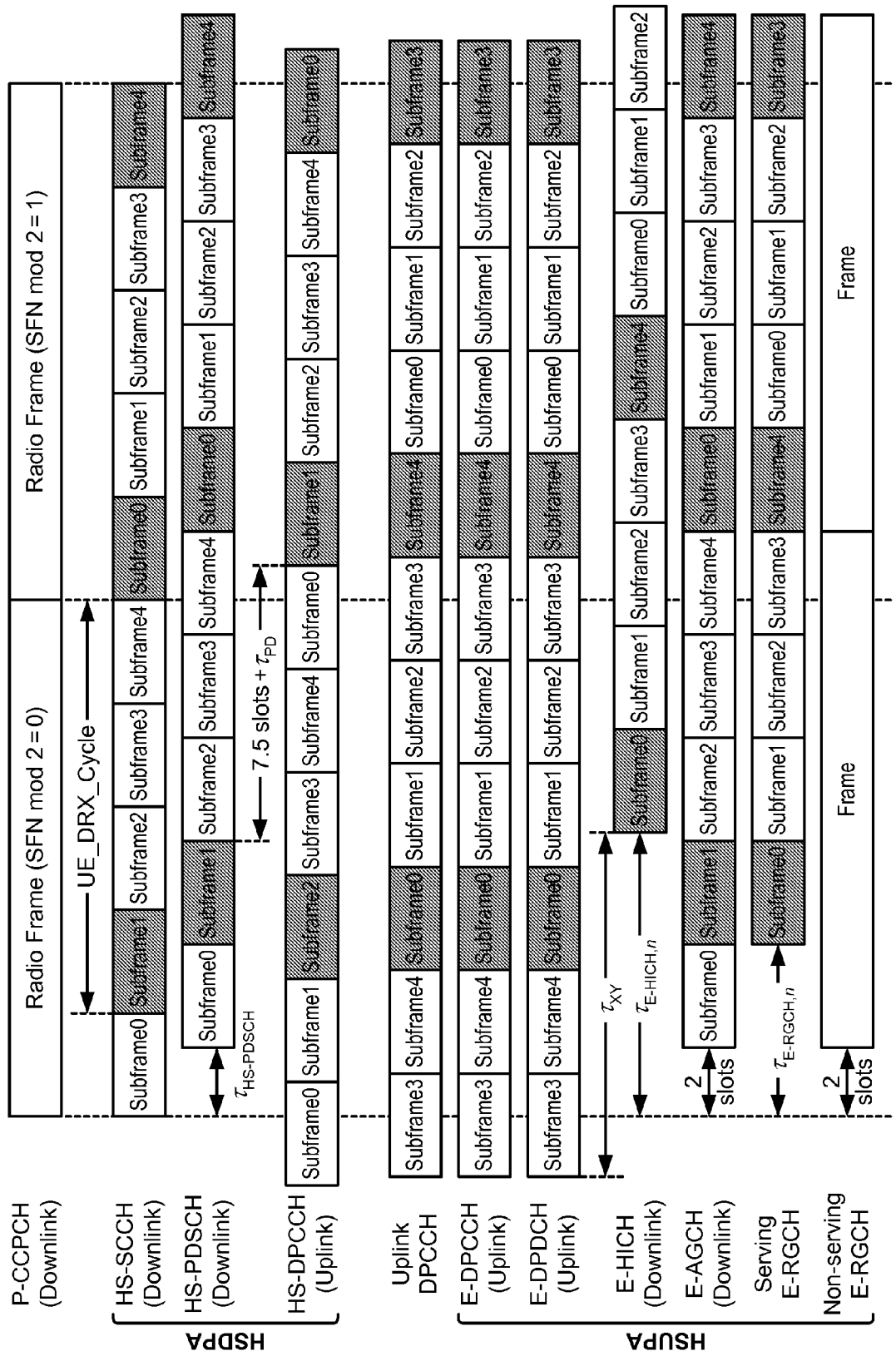
FIG. 3 shows physical channels used for HSDPA and HSUPA.

FIG. 3 shows the physical channels used for HSDPA and HSUPA. In UMTS, the transmission timeline is partitioned into frames, with each frame being identified by a system frame number (SFN). Each frame has a duration of 10 milliseconds (ms) and is partitioned into five subframes 0 through 4. Each subframe has a duration of 2 ms and covers three slots. Each slot has a duration of 0.667 ms and covers 2560 chips at 3.84 Mcps, or $T_{slot}=2560$ chips.

On the downlink, the P-CCPCH carries pilot and the SFN. The P-CCPCH is used directly as timing reference for the downlink physical channels and is used indirectly as timing reference for the uplink physical channels. The subframes of the HS-SCCH are time-aligned with the P-CCPCH. The subframes of the HS-PDSCH are delayed by $\tau_{HS-PDSCH}=2T_{slot}$ from the subframes of the HS-SCCH. The subframes of the E-HICH are delayed by $\tau_{E-HICH,n}$ from the subframes of the HS-SCCH, where $\tau_{E-HICH,n}$ is defined in 3GPP TS 25.211.

The E-AGCH is delayed by two slots from the start of the P-CCPCH. An absolute grant may be sent in one frame when the E-DCH has a transmission time interval (TTI) of 10 ms and may be sent in one subframe when the E-DCH has a TTI of 2 ms. The serving E-RGCH is delayed by $\tau_{E-RGCH,n}$ from the start of the P-CCPCH, and a serving relative grant may be sent in 8 ms frame when the E-DCH has a TTI of 10 ms or in one subframe when the E-DCH has a TTI of 2 ms. The non-serving E-RGCH is delayed by two slots from the start of the P-CCPCH, and a non-serving relative grant may be sent in one frame.

On the uplink, the subframes of the HS-DPCCH are delayed by 7.5 slots from the subframes of the HS-PDSCH at the UE, where $\tau_{PD}$ in FIG. 3 denotes the propagation delay from the Node B to the UE. The uplink DPCCH, E-DPCCH, and E-DPDCH are time-aligned and their frame timing is m×256 chips offset from the frame timing of the HS-DPCCH. The frame timing for the downlink and uplink physical channels is described in 3GPP TS 25.211.

When HSDPA and HSUPA were defined, the focus was on system performance and the main metric was sector throughput (on the downlink and uplink) for full buffer traffic. One example of this original focus is the fact that the UEs are expected to continuously monitor the control channels transmitted on the downlink, e.g., the E-AGCH and E-RGCH for HSUPA and the HS-SCCH for HSDPA. This continuous monitoring may significantly deplete battery power of the UEs. This limitation is partly addressed in a continuous packet connectivity (CPC) work item and with a discontinuous reception (DRX) feature described in 3GPP TR 25.903, entitled "Continuous Connectivity for Packet Data Users," March 2007, which is publicly available. However, 3GPP TR 25.903 mainly focuses on monitoring of the HS-SCCH and CPICH.

The monitoring requirements of the grant channels (the E-AGCH and E-RGCH) for HSUPA may be relaxed based on scheduling characteristics of the data and signaling being sent. In UMTS, a MAC-d flow may be either (i) a scheduled flow that may be sent when scheduled, e.g., via grants of radio resources for the flow, or (ii) a non-scheduled flow that may be sent without requiring grants of radio resources. In general, the uplink for a UE may include scheduled MAC-d flows and/or non-scheduled MAC-d flows. In HSUPA, the scheduled MAC-d flows are controlled by the grant channels whereas the non-scheduled MAC-d flows are not controlled by the grant channels.

Techniques for smart monitoring of the grant channels in order to conserve battery power are described herein. The techniques provide some criteria for determining whether or not to monitor the grant channels. The risk of allowing a UE to stop monitoring the grant channels is missed grants. The UE should thus monitor these grant channels when they can affect the behavior of the UE.

In a first channel monitoring scheme, a UE may monitor the grant channels in accordance with following rules:
1. The UE continuously monitors the grant channels if the uplink for the UE includes at least one scheduled MAC-d flow, and
2. The UE may stop monitoring the grant channels if the uplink includes only non-scheduled MAC-d flows.

The applicability of the first scheme may be dependent on the likelihood of the uplink including only non-scheduled MAC-d flows. Simple real-time services (e.g., VoIP) typically include three MAC-d flows:
One non-scheduled MAC-d flow transporting signaling radio bearers,
One non-scheduled MAC-d flow transporting Real-time Transport Protocol (RTP) payload, e.g., VoIP traffic, and
One scheduled or non-scheduled MAC-d flow transporting Session Initiation Protocol/RTP Control Protocol (SIP/RTCP) signaling.

The MAC-d flow transporting SIP/RTCP signaling may have a very low activity level, e.g., just handshakes at initiation and termination of the VoIP call. If this MAC-d flow is configured as a non-scheduled MAC-d flow, then the grant channels may not need to be configured during call setup, and the UE do not need to monitor these grant channels. However, if the MAC-d flow for the SIP/RTCP signaling is configured as a scheduled MAC-d flow, then the grant channels will be configured, and the UE may need to continuously monitor these grant channels even though they may not carry any signaling for the UE and hence do not affect the UE for a vast majority of the time.

Furthermore, if richer services are configured (e.g., VoIP plus gaming), then it is likely that at least one scheduled MAC-d flow will be configured. For example, real-time services requiring a non-scheduled MAC-d flow will typically include a scheduled flow, e.g., for SIP signaling. Thus, the UE may be forced to always monitor the grant channels even though these grant channels may be used very seldom. As a result, the rule requiring the UE to continuously monitor the grant channels if at least one scheduled MAC-d flow is configured may force the UE to monitor the grant channels in many cases, even when the scheduled MAC-d flow(s) have a low activity level. Consequently, the UE may consume excessive battery power except for calls in which only non-scheduled MAC-d flows are configured.

The UE may send scheduling information (SI) at any time on the E-DPDCH whenever the UE has data to transmit on the uplink. The scheduling information may include the following:

Total E-DCH Buffer Status (TEBS)—indicate the total amount of data available across all logical channels and the amount of data available for transmission in the RLC layer,
Highest priority Logical channel ID (HLID)—indicate the highest priority logical channel with available data,
Highest priority Logical channel Buffer Status (HLBS)—indicate the amount of data available from the logical channel identified by the HLID, and
UE Power Headroom (UPH)—indicate the ratio of the maximum UE transmission power and the corresponding DPCCH code power.

Scheduling information is described in detail in the aforementioned 3GPP TS 25.321. The serving cell receives the scheduling information from the UE and may send a grant of resources for the E-DPDCH to the UE. The UE may monitor the grant channels upon sending scheduling information in order to detect for a possible grant from the serving cell.

The UE may receive an absolute grant in response to sending scheduling information or may receive an absolute grant during call setup. The absolute grant is valid for an indefinite period of time until it is revoked by the serving cell or modified by the serving and/or non-serving cells. Hence, while the UE has an outstanding grant, the UE may monitor the grant channels of the serving and non-serving cells in order to detect for possible changes to the current grant.

In a second channel monitoring scheme, the UE may monitor the grant channels in accordance with following rules:
1. The UE starts monitoring the grant channels of the serving cell as soon as the UE transmits scheduling information indicating that the UE has non-zero amount of data to transmit, or TEBS>0,
2. The UE monitors the grant channels of the cells in the serving RLS while the UE has a non-zero outstanding grant, and
3. The UE may stop monitoring the grant channels of the cells in the serving RLS if the grant for the UE becomes zero and if the UE has no pending data to transmit on the uplink.

For the second scheme, the UE may monitor the grant channels based on any of the following criteria: (i) the UE has sent scheduling information and expects a grant, (ii) the UE has an outstanding grant that might be changed, or (iii) the UE expects to receive a grant for whatever reason.

The UE may have an outstanding grant that may have been received during call setup or in response to scheduling information sent by the UE. This grant may force the UE to continually monitor the grant channels. If the UE has no data to send and/or does not want to continue to monitor the grant channels, then the UE may send scheduling information indicating that the UE has no data to send. The serving cell may then revoke the grant, and the UE may stop monitoring the grant channels.

Figure 4:
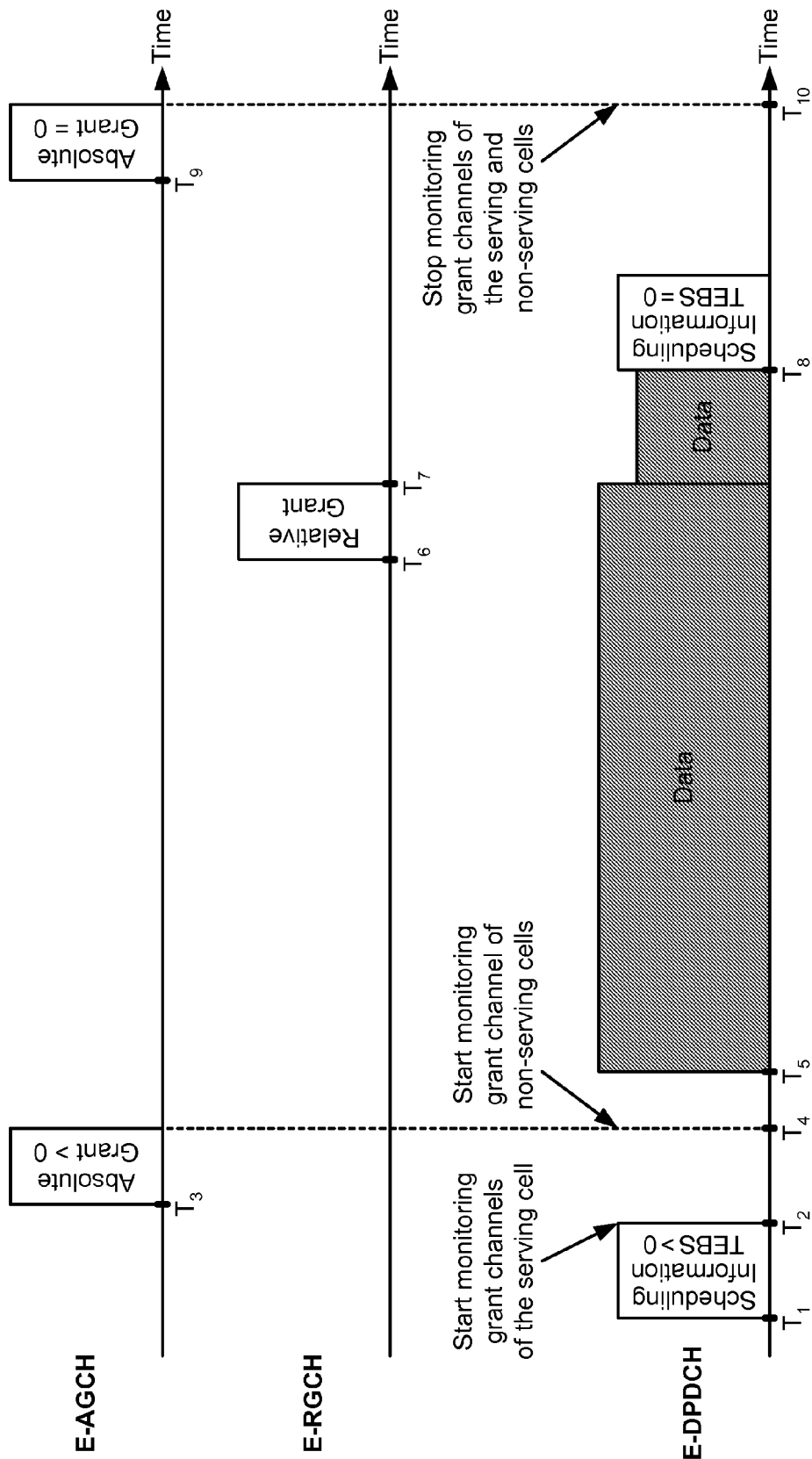
FIG. 4 shows monitoring of grant channels for uplink data transmission.

FIG. 4 shows example transmission on the uplink with HSUPA and using the monitoring techniques for the second scheme. Initially, the UE has no grant for the E-DPDCH and does not monitor the grant channels. At time $T_1$, the UE has data to transmit on the uplink and sends scheduling information with TEBS>0 on the E-DPDCH to indicate that the UE has data to transmit. From time $T_1$ or $T_2$ onward, the UE monitors the grant channels of the serving cell. At time $T_3$, the serving cell sends an absolute grant to the UE on the E-AGCH. At time $T_4$, the UE receives the absolute grant and starts monitoring the grant channels of the non-serving cells. At time $T_5$, the grant is effective and the UE may transmit data on the E-DPDCH in accordance with the grant. At time $T_6$, the UE receives a relative grant from the serving cell or a non-serving cell and revises its transmission on the E-DPDCH accordingly at time $T_7$.

At time $T_8$, the UE has no more data to transmit on the uplink and sends scheduling information with TEBS=0 to indicate that the UE has no data to transmit. At time $T_9$, the serving cell sends a zero absolute grant to the UE on the E-AGCH. At time $T_{10}$, the UE receives the zero absolute grant and can stop monitoring the grant channels.

The UE may operate with discontinuous reception (DRX) and/or discontinuous transmission (DTX). For DRX, the UE may have certain enabled downlink subframes in which the Node Bs can send downlink transmission to the UE. The enabled downlink subframes may also be referred to as reception frames and may be determined by an HS-SCCH reception pattern. For DTX, the UE may have certain enabled uplink subframes in which the UE can send uplink transmission to the Node Bs. The enabled uplink subframes may be determined by an uplink DPCCH burst pattern. The UE may send signaling and/or data on the enabled uplink subframes and may receive signaling and/or data on the enabled downlink subframes. The UE may power down during the non-enabled subframes to conserve battery power.

FIG. 3 shows an example configuration of DTX and DRX for the UE. In this example, the HS-SCCH reception pattern is defined with UE_DRX_cycle=4 subframes. The enabled downlink subframes are thus spaced apart by four subframes and are shown with gray shading. The uplink DPCCH burst pattern is defined with UE_DTX_cycle_1=4. The enabled uplink subframes are thus also spaced apart by four subframes and are shown with gray shading. The enabled downlink and uplink subframes may be determined by DTX and DRX parameters from the serving cell. The enabled downlink and uplink subframes may be aligned in time to reduce rise-over-thermal (ROT) and to extend possible sleep time for the UE.

The UE may monitor the E-AGCH and E-RGCH from cells in the serving RLS and may also monitor the E-RGCH from cells not in the serving RLS. Ideally, all absolute and relative grants for the UE should be sent during the enabled downlink subframes for the UE, so that the UE can receive all of these grants when the UE is awake. However, it may be difficult to coordinate the relative grants for the UE to fall within the UE's enabled downlink subframes for several reasons. First, the transmission of the non-serving relative grants may not be coordinated across the network. Thus, the serving cell which controls the UE_DRX_cycle cannot ensure that the non-serving relative grants will fall within the enabled downlink subframes of the UE. Second, a given cell may send a single relative grant to all UEs not served by that cell, e.g., as a form of interference control. This may make it even harder to have all relative grants for the UE fall within its enabled downlink subframes. Third, the non-serving relative grants are sent in one 10 ms frame, as shown in FIG. 3, regardless of the TTI of the E-DCH for the UE.

If the UE has to monitor a non-serving E-RGCH and if the UE has a UE_DRX_cycle=4 as shown in FIG. 3, then DRX is effectively disabled for the UE. This is because a relative grant is sent in one frame on the non-serving E-RGCH, which is longer than the UE_DRX_cycle. If the UE is allowed to not monitor the non-serving E-RGCH, then the UE may be able to DRX approximately 26% of the time in this example.

It may be unrealistic to assume that the non-serving E-RGCHs can be coordinated across the network. Thus, if the UE is required to monitor all assigned non-serving E-RGCHs and if the non-serving E-RGCHs are not coordinated across the network, then the UE may be able to DRX based on any one of the following conditions:

1. The UE is not assigned a non-serving E-RGCH, and
2. The UE may stop monitoring the non-serving E-RGCHs when relative grants on these non-serving E-RGCHs cannot impact the current grant of the UE Condition 1 may not be likely. Condition 2 may be true, for example, if the UE has a minimum grant. In this case, a down relative grant from a non-serving E-RGCH would not change the current grant of the UE, which is the same as ignoring the non-serving E-RGCHs. However, condition 2 may also be unlikely because a grant does not expire and there may be a strong possibility that the network would not cancel the grant. Hence, the UE may be forced to monitor the assigned non-serving E-RGCHs all the time.

The UE may be able to skip monitoring the non-serving E-RGCHs under certain scenarios. The relative grants on the non-serving E-RGCHs are used mainly for uplink interference control. The UE does not cause uplink interference while it is inactive. Hence, the relative grants on the non-serving E-RGCHs are generally not addressed to the UE while it is inactive, and the UE may safely ignore these relative grants.

In a third channel monitoring scheme, the UE may monitor the grant channels (e.g., the E-AGCH and E-RGCH) in accordance with following rules:

1. The UE monitors the grant channels if its scheduled transmission buffer is non-zero, or TEBS>0, and
2. The UE may stop monitoring the grant channels if its scheduled transmission buffer is empty, or TEBS=0.

Rule 1 may be applicable with or without DRX. When the DRX feature is enabled, the UE may monitor the grant channels of the serving and non-serving cells during the enabled downlink subframes. When the DRX feature is enabled, the UE may ignore the non-serving E-RGCHs during the non-enabled downlink subframes.

The physical layer may perform monitoring of the grant channels based on events triggered by the MAC layer. Some communication between the MAC and physical layers may be used to support monitoring of the grant channels. In one design, Section 11.8.1 of 3GPP 25.321 for the MAC layer may be modified as follows:

11.8.1.x Monitoring of Absolute and Relative Grant Channels

When the DRX feature is enabled by higher layers, the downlink reception of E-AGCH and E-RGCH sets is required in the following conditions:

At least one MAC-d flow is configured with a scheduled transmission and TEBS>0.

A corollary of the above rule is that downlink reception of the E-AGCH and E-RGCH sets is not required in the following conditions:

All MAC-d flows are configured with non-scheduled transmission or TEBS=0.

When DRX is enabled, the UE may monitor the E-AGCH and E-RGCH during reception subframes indicated by the HS-SCCH reception pattern and may go to sleep during other subframes.

In general, the UE may monitor the grant channels based on any set of rules. For example, the UE may monitor the grant channels based on rule 1 in the third scheme (monitor the grant channels when TEBS>0 and there is at least one scheduled flow) and also rule 2 in the second scheme (monitor the grant channels while the UE has a non-zero outstanding grant). The UE may also monitor the grant channels while the UE is processing another downlink channel, e.g., the E-HICH to receive ACK/NAK feedback for an uplink data transmission sent on the E-DPDCH.

The monitoring rules given above for various schemes may allow the UE to achieve significant battery savings while not unduly restricting the operation of the schedulers for the cells. Other rules may also be defined for when to require the UE to monitor the grant channels. Other rules may also be defined for when to allow the UE to stop monitoring the grant channels.

Figures 5, 6:
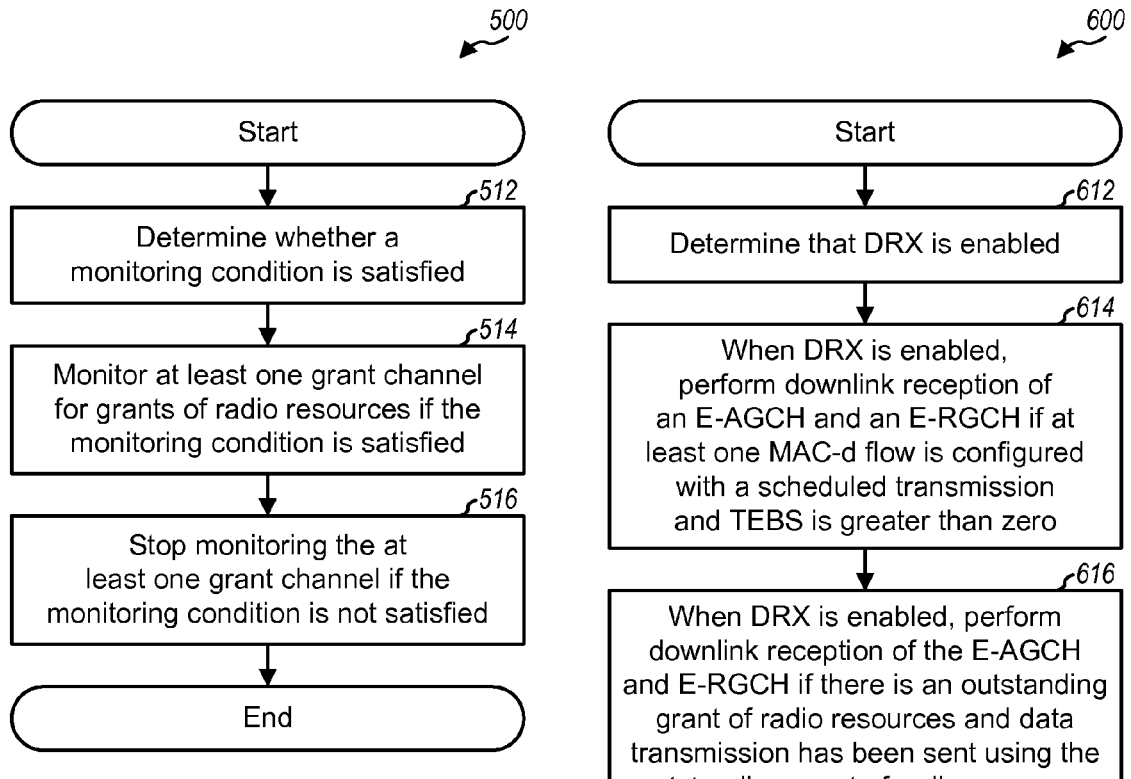
FIG. 5 shows a process for monitoring grant channels.
FIG. 6 shows another process for monitoring grant channels.

FIG. 5 shows a design of a process 500 for monitoring grant channels. The UE may determine whether a monitoring condition is satisfied (block 512). The UE may monitor at least one grant channel for grants of radio resources if the monitoring condition is satisfied (block 514). The UE may stop monitoring the at least one grant channel if the monitoring condition is not satisfied (block 516). The at least one grant channel may comprise the E-AGCH and E-RGCH in UMTS or some other grant channels in other wireless networks.

The UE may determine that the monitoring condition is satisfied and may monitor the at least one grant channel (i) after sending scheduling information indicating that there is data to send on the uplink, (ii) if there is an outstanding grant of radio resources for the uplink, (iii) if a grant of radio resources is expected, (iv) if there is at least one scheduled flow and a data buffer for the at least one scheduled flow is not empty, (v) if there is an outstanding grant of radio resources and data transmission has been sent using the outstanding grant of radio resources, and/or (vi) if there is at least one other control channel to monitor. The UE may also determine that the monitoring condition is satisfied based on other criteria.

The UE may determine that the monitoring condition is not satisfied and may stop monitoring the at least one grant channel (i) when there is no outstanding grant of radio resources, (ii) if there is no outstanding grant of radio resources and if there is no data to send, and/or (iii) if there are no scheduled flows or if there is no data to send for scheduled flows. The UE may also determine that the monitoring condition is not satisfied based on other criteria.

The UE may continuously monitor the at least one grant channel while the monitoring condition is satisfied. The UE may also monitor the at least one grant channel during designated time intervals if the monitoring condition is satisfied and DRX is enabled. The UE may monitor the at least one grant channel of a serving cell if the monitoring condition is satisfied and there is no outstanding grant of radio resources. The UE may monitor the at least one grant channel of at least one cell in a serving RLS and possibly cells not in the serving RLS if the monitoring condition is satisfied.

FIG. 6 shows a design of a process 600 for monitoring grant channels. The UE may determine that DRX is enabled (block 612). When DRX is enabled, the UE may perform downlink reception of an E-AGCH and an E-RGCH if at least one MAC-d flow is configured with a scheduled transmission and TEBS is greater than zero (block 614). When DRX is enabled, the UE may perform downlink reception of the E-AGCH and E-RGCH if there is an outstanding grant of radio resources and data transmission has been sent using the outstanding grant of radio resources (block 616). When DRX is enabled, the UE may perform downlink reception of the E-AGCH and E-RGCH when there is at least one other control channel to monitor (block 618). When DRX is enabled, the UE may perform downlink reception of the E-AGCH and E-RGCH during reception subframes indicated by an HS-SCCH reception pattern.

Figure 7:
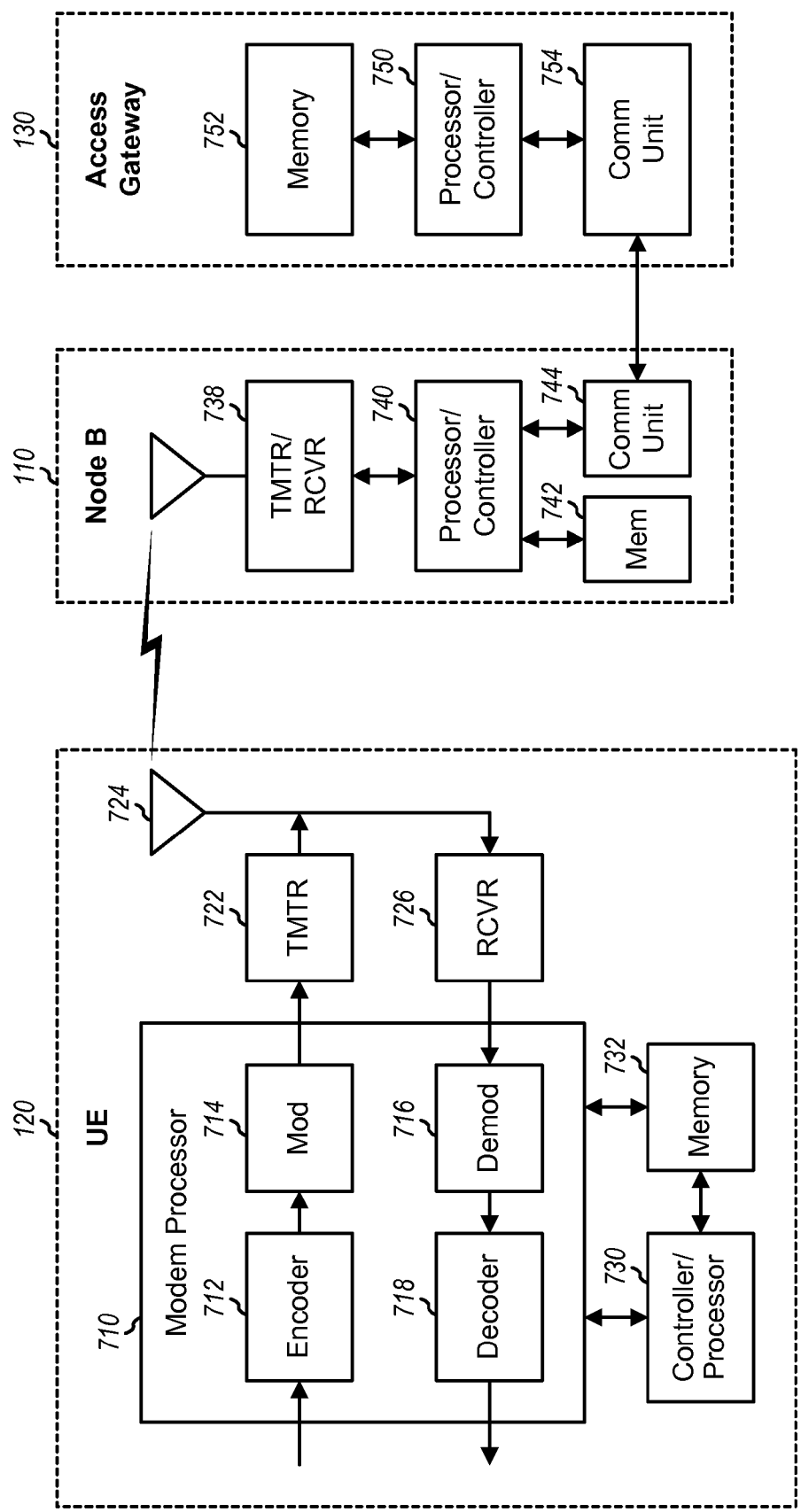
FIG. 7 shows a block diagram of a UE, a Node B, and an access gateway.

FIG. 7 shows a block diagram of a design of UE 120. On the uplink, an encoder 712 may receive data and signaling to be sent by UE 120 on the uplink. Encoder 712 may process (e.g., format, encode, and interleave) the data and signaling. A modulator (Mod) 714 may further process (e.g., modulate, channelize, and scramble) the encoded data and signaling and provide output chips. A transmitter (TMTR) 722 may condition (e.g., convert to analog, filter, amplify, and frequency upconvert) the output chips and generate an uplink signal, which may be transmitted via an antenna 724 to the Node Bs.

On the downlink, antenna 724 may receive downlink signals transmitted by Node B 110 and other Node Bs. A receiver (RCVR) 726 may condition (e.g., filter, amplify, frequency downconvert, and digitize) the received signal from antenna 724 and provide samples. A demodulator (Demod) 716 may process (e.g., descramble, channelize, and demodulate) the samples and provide symbol estimates. A decoder 718 may further process (e.g., deinterleave and decode) the symbol estimates and provide decoded data. Encoder 712, modulator 714, demodulator 716, and decoder 718 may be implemented by a modem processor 710. These units may perform processing in accordance with the radio technology (e.g., W-CDMA) used by the wireless network.

A controller/processor 730 may direct the operation of various units at UE 120. Controller/processor 730 may implement process 500 in FIG. 5, process 600 in FIG. 6, and/or other processes for monitoring grant channels. Memory 732 may store program codes and data for UE 120.

FIG. 7 also shows a block diagram of Node B 110 and access gateway 130 in FIG. 1. Node B 110 may be any of the Node Bs shown in FIG. 1. For Node B 110, a transmitter/receiver 738 may support radio communication with UE 120 and other UEs. A processor/controller 740 may perform various functions for communication with the UEs. Memory (Mem) 742 may store program codes and data for Node B 110. A communication (Comm) unit 744 may support communication with access gateway 130. For access gateway 130, a processor/controller 750 may perform various functions to support communication services for the UEs. Memory 752 may store program codes and data for Node B 110. A communication unit 754 may support communication with Node B 110.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the scope of the disclosure. Thus, the disclosure is not intended to be limited to the examples and designs described herein but is to be accorded the widest scope consistent with the principles and novel features disclosed herein.

What is claimed is:

1. A user equipment apparatus comprising:
   at least one processor to determine whether a monitoring condition is satisfied, to monitor at least one grant channel for grants of radio resources if the monitoring condition is satisfied, and to stop monitoring all grant channels if the monitoring condition is not satisfied, wherein the monitoring condition is determined to be satisfied according to an occurrence of one or more criteria, wherein the one or more criteria includes existence of an outstanding grant of radio resources available in a grant channel for an uplink data transmission based on an absolute grant; and
   a memory coupled to the at least one processor.

2. The apparatus of claim 1, wherein the at least one processor monitors the at least one grant channel if there is at least one scheduled flow and a data buffer for the at least one scheduled flow is not empty.

3. The apparatus of claim 1, wherein the monitoring condition is satisfied through an outstanding grant of radio resources and data transmission has been sent using the outstanding grant of radio resources.

4. The apparatus of claim 1, wherein the at least one processor monitors the at least one grant channel if there is at least one other control channel to monitor.

5. The apparatus of claim 1, wherein the at least one processor continuously monitors the at least one grant channel while the monitoring condition is satisfied.

6. The apparatus of claim 1, wherein the at least one processor monitors the at least one grant channel during designated time intervals if the monitoring condition is satisfied and discontinuous reception (DRX) is enabled.

7. The apparatus of claim 1, wherein the at least one processor stops monitoring the at least one grant channel when there is no outstanding grant of radio resources.

8. The apparatus of claim 1, wherein the at least one processor stops monitoring the at least one grant channel if there is no outstanding grant of radio resources and if there is no data to send.

9. The apparatus of claim 1, wherein the at least one processor stops monitoring the at least one grant channel if there are no scheduled flows or if there is no data to send for scheduled flows.

10. The apparatus of claim 1, wherein the at least one processor monitors the at least one grant channel of a serving cell if the monitoring condition is satisfied and there is no outstanding grant of radio resources.

11. The apparatus of claim 1, wherein the at least one processor monitors the at least one grant channel of at least one cell in a serving radio link set (RLS) if the monitoring condition is satisfied.

12. The apparatus of claim 1, wherein the at least one grant channel comprises an E-DCH Absolute Grant Channel (E-AGCH) and an E-DCH Relative Grant Channel (E-RGCH).

13. A method comprising:
   determining, by a user equipment, whether a monitoring condition is satisfied, wherein the monitoring condition is determined to be satisfied according to an occurrence of one or more criteria, wherein the one or more criteria includes existence of an outstanding grant of radio resources available in a grant channel for an uplink data transmission based on an absolute grant monitoring at least one grant channel for grants of radio resources if the monitoring condition is satisfied; and stopping monitoring all grant channels if the monitoring condition is not satisfied.

14. The method of claim 13, wherein the monitoring the at least one grant channel comprises monitoring the at least one grant channel if there is at least one scheduled flow and a data buffer for the at least one scheduled flow is not empty.

15. The method of claim 13, wherein the monitoring condition is satisfied through an outstanding grant of radio resources and data transmission has been sent using the outstanding grant of radio resources.

16. The method of claim 13, wherein the monitoring the at least one grant channel comprises monitoring the at least one grant channel if there is at least one other control channel to monitor.

17. The method of claim 13, wherein the monitoring the at least one grant channel comprises monitoring the at least one grant channel during designated time intervals if the monitoring condition is satisfied and discontinuous reception (DRX) is enabled.

18. A user equipment apparatus comprising:
means for determining whether a monitoring condition is satisfied, wherein the monitoring condition is determined to be satisfied according to an occurrence of one or more criteria, wherein the one or more criteria includes existence of an outstanding grant of radio resources available in a grant channel for an uplink data transmission based on an absolute grant;
means for monitoring at least one grant channel for grants of radio resources if the monitoring condition is satisfied; and
means for stopping monitoring all grant channels if the monitoring condition is not satisfied.

19. The apparatus of claim 18, wherein the means for monitoring the at least one grant channel comprises means for monitoring the at least one grant channel if there is at least one scheduled flow and a data buffer for the at least one scheduled flow is not empty.

20. The apparatus of claim 18, wherein the monitoring condition is satisfied through an outstanding grant of radio resources and data transmission has been sent using the outstanding grant of radio resources.

21. The apparatus of claim 18, wherein the means for monitoring the at least one grant channel comprises means for monitoring the at least one grant channel if there is at least one other control channel to monitor.

22. The apparatus of claim 18, wherein the means for monitoring the at least one grant channel comprises means for monitoring the at least one grant channel during designated time intervals if the monitoring condition is satisfied and discontinuous reception (DRX) is enabled.

23. A computer program product, comprising:
non-transitory computer-readable medium comprising:
code for causing a computer at a user equipment to determine whether a monitoring condition is determined to be satisfied according to an occurrence of one or more criteria, wherein the one or more criteria includes existence of an outstanding grant of radio resources available in a grant channel for an uplink data transmission based on an absolute grant;
code for causing the computer to monitor at least one grant channel for grants of radio resources if the monitoring condition is satisfied; and
code for causing the computer to stop monitoring all grant channels if the monitoring condition is not satisfied.

24. The computer program product of claim 23, the non-transitory computer-readable medium further comprising:
code for causing the computer to monitor the at least one grant channel if there is at least one scheduled flow and a data buffer for the at least one scheduled flow is not empty.

25. The computer program product of claim 23, the non-transitory computer-readable medium further comprising:
code for causing the computer to monitor the at least one grant channel when the monitoring condition is satisfied through an outstanding grant of radio resources and data transmission has been sent using the outstanding grant of radio resources.

26. The computer program product of claim 23, the non-transitory computer-readable medium further comprising:
code for causing the computer to monitor the at least one grant channel if there is at least one other control channel to monitor.

27. The computer program product of claim 23, the non-transitory computer-readable medium further comprising:
code for causing the computer to monitor the at least one grant channel during designated time intervals if the monitoring condition is satisfied and discontinuous reception (DRX) is enabled.

28. An apparatus comprising:
at least one processor to determine that discontinuous reception (DRX) is enabled and, when DRX is enabled, to perform downlink reception of an E-DCH Absolute Grant Channel (E-AGCH) and an E-DCH Relative Grant Channel (E-RGCH) if at least one Medium Access Control (MAC)-d flow is configured with a scheduled transmission and total E-DCH buffer status (TEBS) is greater than zero and during reception subframes indicated by a high speed shared control channel (HS-SCCH) reception pattern; and
a memory coupled to the at least one processor.

29. The apparatus of claim 28, wherein when DRX is enabled the at least one processor performs downlink reception of the E-AGCH and E-RGCH if there is an outstanding grant of radio resources and data transmission has been sent using the outstanding grant of radio resources.

30. The apparatus of claim 28, wherein when DRX is enabled the at least one processor performs downlink reception of the E-AGCH and E-RGCH when there is at least one other control channel to monitor.

31. A method comprising:
determining that discontinuous reception (DRX) is enabled; and
performing downlink reception of an E-DCH Absolute Grant Channel (E-AGCH) and an E-DCH Relative Grant Channel (E-RGCH), when DRX is enabled, if at least one Medium Access Control (MAC)-d flow is configured with a scheduled transmission and total E-DCH buffer status (TEBS) is greater than zero during reception subframes indicated by a high speed shared common channel (HS-SCCH) reception pattern.

32. The method of claim 31, wherein the performing downlink reception comprises performing downlink reception of the E-AGCH and E-RGCH if there is an outstanding grant of radio resources and data transmission has been sent using the outstanding grant of radio resources.

33. The method of claim 31, wherein the performing downlink reception comprises performing downlink reception of the E-AGCH and E-RGCH when there is at least one other control channel to monitor.

34. A computer program product, comprising:

a non-transitory computer-readable medium comprising code for:

determining that discontinuous reception (DRX) is enabled; and performing downlink reception of an E-DCH Absolute Grant Channel (E-AGCH) and an E-DCH Relative Grant Channel (E-RGCH), when DRX is enabled, if at least one Medium Access Control (MAC)-d flow is configured with a scheduled transmission and total E-DCH buffer status (TEBS) is greater than zero during reception subframes indicated by a high speed shared common channel (HS-SCCH) reception pattern.

35. An apparatus, comprising:

means for determining that discontinuous reception (DRX) is enabled; and means for performing downlink reception of an E-DCH Absolute Grant Channel (E-AGCH) and an E-DCH Relative Grant Channel (E-RGCH), when DRX is enabled, if at least one Medium Access Control (MAC)-d flow is configured with a scheduled transmission and total E-DCH buffer status (TEBS) is greater than zero during reception subframes indicated by a high speed shared common channel (HS-SCCH) reception pattern.

36. The apparatus of claim 1, wherein the one or more criteria further comprises sending of scheduling information indicating there is data to send.

37. The apparatus of claim 1, wherein the one or more criteria further comprises an expectation of a grant of radio resources.

* * * * *